United States Patent Office 2,727,921
Patented Dec. 20, 1955

2,727,921

HYDROCARBON OXIDATION

Milton A. Taves, Wilmington, Del., assignor to Hercules Powder Company, Wilmington, Del., a corporation of Delaware No Drawing. Application May 18, 1954,
Serial No. 430,744

17 Claims. (Cl. 260—524)

This invention relates to the oxidation of hydrocarbons. In a specific aspect, this invention relates to the oxidation of an aromatic hydrocarbon, such as an alkylated benzene, to form the corresponding organic acid. In a more specific aspect, this invention relates to the oxidation of p-xylene to form p-toluic acid.

When an alkylated benzene, such as p-xylene, is oxidized with an oxygen-containing gas in the presence of a cobalt oxidation catalyst, an oxidate containing substantial amounts of the corresponding organic acid, for example, p-toluic acid, is formed. One of the methods for recovering the p-toluic acid from the resulting oxidate involves cooling the oxidate to crystallize the p-toluic acid and then separating the crystallized acid from the oxidate by filtration or other suitable recovery means. The oxidation step can be effected at atmospheric pressure, and ordinarily in such an oxidation the temperature is sufficiently high that the water formed during the oxidation reaction is volatilized and carried away in the off-gas. However, it is preferred to carry out the oxidation at a superatmospheric pressure, for example, at least 15 p. s. i. g., and under these conditions, substantial amounts of water resulting from the oxidation reaction are maintained in the oxidate. When the oxidate from a superatmospheric oxidation reaction is crystallized and filtered, while maintaining some of the water of reaction in the oxidate, a considerable amount of the cobalt catalyst is retained on the organic acid filter cake. Ordinarily, it is desirable to wash the filter cake with p-xylene which is then passed to the oxidation reaction. However, the cobalt catalyst that is retained on the filter cake cannot be removed by p-xylene washing.

In accordance with this invention, it has been found that the amount of cobalt catalyst retained on the organic acid filter cake in a superatmospheric oxidation system can be substantially reduced by removing water from the oxidate prior to the separation of the acid from the oxidate by filtration or other suitable means.

The following examples are illustrative of the advantages and utility of this invention.

*Example 1*

A charge of 2000 parts by weight of p-xylene and 4 parts of cobaltous toluate (0.716 part cobalt) was placed in a stainless steel autoclave and air was blown through the mixture at 150° C. and 150 p. s. i. g. pressure until an oxidate containing about 30% p-toluic acid was formed. The oxidate was cooled to room temperature to crystallize p-toluic acid, the pressure was released, the product was filtered, and the p-toluic acid precipitate was washed with 500 parts of p-xylene. Analysis of the p-toluic acid cake and the combined filtrate and xylene wash indicated that the cake contained 94.5% of the cobalt and that the filtrate and washes contained 5.5% of the cobalt.

*Example 2*

An oxidate was prepared as in Example 1. When the oxidation was complete, the pressure on the system was gradually reduced, the heat was dissipated by refluxing the xylene, and p-toluic acid was crystallized at room temperature and at a subatmospheric pressure. Substantially all of the water was separated from the mixture during the crystallization by removing the water that distilled off. The filtered p-toluic acid cake contained 39% of the cobalt and the combined filtrate and wash contained 61% of the cobalt.

*Example 3*

A sample of oxidate was withdrawn from a continuous p-xylene oxidation tower operating at 162 p. s. i. g., 143° C., an acid number level of 150, and a cobalt concentration of 0.066%. The sample was crystallized and filtered under pressure, and the final cake was washed with p-xylene. The cake contained 92% of the cobalt and the filtrate and wash contained 8% of the cobalt charged to the oxidation.

*Example 4*

An oxidate sample was prepared as in Example 3. The sample that was withdrawn from the tower was transferred to a crystallization vessel fitted with a reflux condenser, and vacuum was applied to the top of the condenser. Substantially all of the water in the oxidate sample was refluxed into the condenser, separated and not returned to the crystallization vessel. Crystallization of p-toluic acid was complete in 45 minutes. The temperature, however, had decreased to 60° C. after 25 minutes. The filtered p-toluic acid contained 40% of the cobalt charged to the oxidation, and the remainder of the cobalt was found in the filtrate and xylene wash.

*Example 5*

A charge of 2000 parts by weight of p-xylene and 4 parts of cobaltous toluate (0.716 part cobalt) was placed in a stainless steel autoclave and air was blown through the mixture at 150° C. and 150 p. s. i. g. pressure until an oxidate containing about 30% p-toluic acid was formed. The oxidate was cooled to room temperature to crystallize p-toluic acid, filtered, and the p-toluic acid precipitate was washed with 50 parts of p-xylene. Analysis of the p-toluic acid cake and the combined filtrate and xylene wash indicated that the cake contained 94.5% of the cobalt and that the filtrate and washes contained 5.5% of the cobalt.

*Example 6*

An oxidate prepared in accordance with Example 5 and containing 30% p-toluic acid was blown with air at 130° C. at atmospheric pressure for two hours prior to crystallization. In this manner, substantially all of the water was removed from the oxidation mixture. The p-toluic acid cake was found to contain 19.5% of the cobalt and the filtrate and washes were found to contain 81.5% of the cobalt.

*Example 7*

A sample of oxidate was withdrawn from a continuous p-xylene oxidation tower operating at 149° C., 155 p. s. i. g., at an acid number level of 102, and at a cobalt level of 0.028%. The sample was crystallized and filtered under pressure, and the final cake was washed with p-xylene. The cake contained 92% of the cobalt and the filtrate and wash contained 8% of the cobalt charged to the oxidation reaction.

*Example 8*

An oxidate sample similar to that in Example 7 was withdrawn from the oxidation tower and oxidized further at atmospheric pressure by blowing air through the mixture at a rate of 1.1 cu. ft./lb. for 6.5 hours at 130° C. Substantially all of the water was removed from the mixture during the atmospheric oxidation. The acid number of the oxidate increased to 152 during the atmospheric oxidation. The oxidate was then crystallized and the p-toluic acid was isolated by filtration and washed with p-xylene. The cake contained 13% of the cobalt and the filtrate and wash contained 87% of the cobalt charged to the oxidation.

*Example 9*

A sample of p-xylene oxidate prepared by oxidation of p-xylene at 150° C. and 150 p. s. i. g. was crystallized without removing the water and filtered. The cake was washed with p-xylene and then dried in an oven to remove the p-xylene. The cake contained 980 p. p. m. cobalt. A similar oxidate sample was treated by blowing air through the oxidate at 140–145° C. at a rate of about 100 cc. air/kg. oxidate for one hour. Any water evolved during the air sparge was separated from the oxidate. The cake from this system contained 401 p. p. m. cobalt. An identical cake from an oxidate that had been air blown for 3.5 hours contained 233 p. p. m. cobalt.

*Example 10*

In a run similar to Example 9, nitrogen instead of air was blown through the oxidate. After nitrogen blowing for 0, 1 and 3.5 hours, the dried p-toluic acid cakes contained 980, 380, and 320 p. p. m. cobalt, respectively.

*Example 11*

In a run similar to Example 5, no gas was blown through the oxidate. After holding the oxidate at 140–145° C. with no gas sparge for 0, 1, 3.5, and 11.5 hours, the dried p-toluic acid cakes contained 980, 446, 440, and 328 p. p. m. cobalt, respectively.

In the process, an aromatic hydrocarbon, such as an alkylated benzene, is oxidated in a liquid medium with an oxygen-containing gas in the presence of a cobalt catalyst. The liquid oxidate is cooled to permit the crystallization of organic acids formed during the oxidation, and the crystallized acids are then separated from the oxidate by siutable means such as by filtration. The preferred hydrocarbons that are oxidized in practicing this invention are the alkylated benzenes, for example, toluene, the xylenes, ethylbenzene, propylbenzene, and the like. The preferred hydrocarbons are of the dialkyl type, and each alkyl group usually contains no more than about four carbon atoms. Any of the xylenes can be oxidized in accordance with this invention, and it is preferred to oxidize p-xylene to p-toluic acid. This acid is quite useful in the production of dimethyl terephthalate since it can be esterified to the monoester which, after another oxidation, can be esterified to the diester. This invention will be described in detail with respect to the oxidation of p-xylene to p-toluic acid, but it will be understood that the invention can also be applied to the oxidation of other alkylated benzenes.

The oxidation of the hydrocarbon is carried out at a temperature and pressure such that the oxidation reaction medium is in the liquid phase. At the conditions selected for oxidation, a substantial portion of the oxidation reaction medium or oxidate is water formed during the reaction, and this water can form a separate phase. The oxidation temperature can vary from about 80° C. to about 250° C. with a preferable temperature range being about 125° C. to 175° C. The pressure is suitably adjusted at the oxidation temperature to maintain the oxidation medium in the liquid phase, and it is generally a superatmospheric pressure in excess of about 15 p. s. i. g. and varying up to about 400 p. s. i. g. and higher. Superatmospheric pressures are preferred since such pressures tend to minimize the undesirable ester formation during the oxidation reaction and to increase the rate of oxidation of the hydrocarbon to the desired corresponding acid. It is preferred to carry out the oxidation at a pressure not in excess of about 200 p. s. i. g. and usually from about 125 to 175 p. s. i. g.

In carrying out the oxidation, a cobalt salt of an organic acid is employed. Such cobalt salts as cobalt toluate, cobalt naphthenate, cobalt acetate, and cobalt salts of saturated aliphatic acids containing less than about 12 carbon atoms can be used. The amount of catalyst that is employed to effect the oxidation is variable and generally from 10 to 400 parts per million of cobalt are present in the oxidation reaction medium. However, it will be realized that catalyst concentrations outside this range can be used when desired.

To effect the oxidation, an oxygen-containing gas is passed through the reaction medium. Air is the preferred oxygen-containing gas. However, if desired, substantially pure oxygen as well as oxygen-enriched or oxygen-depleted air can be employed. However, in most instances, air will be used as the oxidizing agent. It is usually desirable to employ the oxygen-containing gas at a rate such that the off-gas from the reactor contains up to about 5% or 10% oxygen by volume.

During the oxidation reaction the cobalt can exist in three forms in the oxidate:

I. In this form the cobalt is in the form of a simple organic acid salt, e. g., cobalt acetate, cobalt toluate, and the like. The salt is soluble in water and less soluble in the p-xylene or other hydrocarbon being oxidized. In this form the cobalt does not catalyze the oxidation reaction.

II. In this form the cobalt exists in a hydrolyzed form, such as cobalt hydroxide, and it is essentially insoluble in water and p-xylene or other hydrocarbon being oxidized. The cobalt in this form does not catalyze the oxidation reaction.

III. In this form the cobalt is present in a complex that is soluble in p-xylene or other hydrocarbon being oxidized, insoluble in water, and the complex catalyzes the oxidation reaction.

The relative amounts of each of the above in an oxidation mixture vary with the conditions employed for the oxidation.

The cobalt in forms I or II is not catalytically active, but it can be converted to the catalytically active complex of form III. During the oxidation reaction, form I is converted to form III. Form II can be converted to form I by reaction with organic acids in the oxidate after water has been removed, and then the cobalt in form I can be converted to the catalytically active complex in form III.

When water is removed from an oxidate, the distribution of cobalt in form I between the hydrocarbon and aqueous phases is altered, and the cobalt is transferred entirely to the hydrocarbon phase. Depending on the solubility and concentration of the particular cobalt salt, it will either dissolve completely in the hydrocarbon or part will dissolve and part will precipitate. Precipitated cobalt can be solubilized by suitable heat treatment of the anhydrous oxidate containing the cobalt. The solubilizing heat treatment may be followed by or coupled with oxidation of the oxidate.

Cobalt in form II can be converted to the hydrocarbon-soluble, catalytically active form by heat treatment of the water-free oxidate combined with oxidation either in separate steps or in the same operation. Heat treatment of the oxidate, after water has been removed, allows the insoluble cobalt to react with organic acids present in the anhydrous oxidate to form salts that are moderately or slightly xylene-soluble, and during oxidation the salts are converted to the catalytically active complex that is completely xylene-soluble.

Thus, several procedures can be used to practice this invention and to increase the amount of catalyst in the filtrate and accordingly decrease the amount of catalyst on the organic acid filter cake. These procedures are demonstrated by the above examples. Removal of water from the oxidate prior to or during crystallization of the organic acid increases the cobalt content of the filtrate. Heat treatment of the oxidate either during the water removal step or subsequent thereto effects a further increase in the cobalt content of the filtrate. Oxidation of the oxidate effects a further increase in the cobalt content of the filtrate. The oxidation is preferably combined with the water removal step, but the two steps can be carried out separately. Usually the oxidate receives the necessary heat treatment during the oxidation step, but, if desired, the oxidate can be heat treated without oxidation either during the water removal step or subsequent thereto but prior to the oxidation step.

To obtain the desired organic acid, the oxidate from the oxidation reaction discussed above is cooled to permit the crystallization of the p-toluic acid or other organic acid corresponding to the hydrocarbon being oxidized and the cooled oxidate is then filtered to recover the p-toluic acid. To practice this invention and to increase the amount of cobalt catalyst in the filtrate, water of reaction is removed from the oxidate prior to the separation of crystallized p-toluic acid therefrom and preferably before or during the crystallization step. One method for removing the water is described in Example 2. In carrying out this method, the oxidate from the oxidation reaction is passed to a vacuum crystallizer where the oxidate is cooled to a temperature not above the temperature at which the p-toluic acid crystallizes and water of reaction is removed during the cooling and crystallization of the acid. A satisfactory method for carrying out the vacuum crystallization step is to attach a reflux condenser to the crystallizer. A vacuum is pulled on the condenser to lower the pressure in the crystallizer below atmospheric pressure, and the temperature in the crystallizer is about room temperature. Under these conditions, a portion of the liquid phase from the oxidate passes to the reflux condenser where water of reaction is condensed and removed. In this manner, it is possible to remove substantially all of the water from the oxidate. After the p-toluic acid has crystallized and water of reaction has been removed from the oxidate, the resulting mixture is then passed to suitable means for recovering the p-toluic acid. In practice, filtration has been found to be a satisfactory method for recovering the p-toluic acid. In this procedure, the temperature at which the water is removed from the oxidate is generally lower than the temperature at which the oxidation reaction is effected. Usually the temperature for water removal is not in excess of about 80° C., and temperatures as low as room temperature and lower can be used. At the actual temperature employed, it is usually desirable to remove the water in a vacuum crystallizer at a subatmospheric pressure. If desired, the anhydrous oxidate thus produced can be heated to a temperature, for example, from 80° to 250° C. for from 0.5 to 5 hours. Preferably the anhydrous oxidate is contacted with air or other oxygen-containing gas during the heat treatment step.

In another procedure for practicing this invention, the amount of cobalt catalyst that can be recycled to the p-xylene oxidation is increased by carrying out the removal of water from the oxidate at a temperature above the crystallization temperature of the p-toluic acid. For example, the temperature for removal of the water can be within the same range at which the oxidation is effected, i. e., 80–250° C. Preferably the removal of water is effected at a temperature varying from 120° C. to the reflux temperature of the oxidate. At these temperatures, substantially all of the water can be removed from the oxidate in a period of 0.5 to 5 hours. Various methods can be employed to remove the water of reaction in this manner. For example, a two-stage oxidation of p-xylene can be employed. In the first stage, the p-xylene is oxidized to p-toluic acid at the conditions described above employing a superatmospheric pressure. After the desired amount of oxidation has occurred, the oxidate can be further oxidized with an oxygen-containing gas, such as air, at substantially the same temperature, or slightly lower, and at atmospheric pressure. The atmospheric pressure oxidation is carried out for a sufficient period of time to remove substantially all of the water from the oxidate. Subsequently, the oxidate is cooled to crystallize the p-toluic acid which is then separated by suitable means such as by filtration. Instead of passing air through the oxidate from the superatmospheric oxidation step, an inert gas, such as nitrogen, can be passed through the oxidate to effect the removal of water at an elevated temperature. Another method for removing water from the oxidate involves refluxing of the oxidate at about atmospheric pressure without passage of any gas through the oxidate. The refluxing is also carried out for a period of time sufficient to permit the removal of substantially all of the water from the oxidate.

The preferred method for effecting this invention involves the removal of water by atmospheric pressure oxidation of an oxidate from the superatmospheric pressure of p-xylene or other hydrocarbon. In this procedure the removal of water results in an improvement in catalyst recycle. The temperature employed in the atmospheric oxidation effects a reaction between cobalt in form II and organic acids in the oxidate, and during the oxidation the cobalt salts thus formed are converted to the catalytically active complex. Thus, a further improvement in catalyst recycle is realized.

Modifications and advantages within the scope of this invention will be apparent to those skilled in the art from the above disclosure.

What I claim and desire to protect by Letters Patent is:

1. In a hydrocarbon oxidation process wherein a hydrocarbon is oxidized at a pressure sufficient to maintain a substantial amount of water in the oxidate and in the presence of a cobalt oxidation catalyst to form an organic acid corresponding to said hydrocarbon and wherein said acid is crystallized and separated from resulting oxidate, the improvement which comprises reducing the cobalt content of the separated acid by removing water from said oxidate prior to separation of crystallized acid from said oxidate.

2. In a process for the oxidation of an alkylated benzene at a superatmospheric pressure sufficient to maintain a substantial amount of water in the oxidate and in the presence of a cobalt oxidation catalyst to form an organic acid corresponding to said alkylated benzene wherein said acid is crystallized and separated from the resulting oxidate, the improvement which comprises reducing the cobalt content of the separated acid by cooling said oxidate to a temperature not above the temperature at which said acid is crystallized in said oxidate prior to separation of crystallized acid from said oxidate and simultaneously removing water from said oxidate.

3. In a process for the oxidation of a xylene at a superatmospheric pressure sufficient to maintain a substantial amount of water in the oxidate and in the presence of a cobalt oxidation catalyst to form the corresponding toluic acid wherein said acid is crystallized and separated from the resulting oxidate, the improvement which comprises reducing the cobalt content of the separated toluic acid by cooling said oxidate to a temperature not above the temperature at which said toluic acid is crystallized in said oxidate prior to separation of crystallized toluic acid from said oxidate and simultaneously removing water from said oxidate.

4. In a process for the oxidation of p-xylene at a superatmospheric pressure sufficient to maintain a substantial amount of water in the oxidate and in the presence of a cobalt oxidation catalyst to form the corresponding p-toluic acid wherein said acid is crystallized and separated from the resulting oxidate, the improvement which comprises reducing the cobalt content of the separated p-toluic acid by cooling said oxidate to a temperature not above the temperature at which said p-toluic acid is crystallized in said oxidate prior to separation of crystallized p-toluic acid from said oxidate and removing water from said oxidate during the cooling of the oxidate and crystallization of p-toluic acid.

5. In a process for the oxidation of p-xylene at a superatmospheric pressure sufficient to maintain a substantial amount of water in the oxidate and in the presence of a cobalt oxidation catalyst to form p-toluic acid wherein said p-toluic acid is crystallized and separated from the resulting oxidate, the improvement which comprises reducing the cobalt content of the separated p-toluic acid by cooling said oxidate to a temperature not above 80° C. and not above the temperature at which said p-toluic acid is crystallized in said oxidate during the crystallization of said p-toluic acid in said oxidate at a subatmospheric pressure and removing water from said oxidate during the cooling of the oxidate and crystallization of the p-toluic acid.

6. The method for producing a toluic acid which comprises oxidizing a xylene with an oxygen-containing gas in the presence of a cobalt oxidation catalyst at a temperature within the range of 80° to 250° C. and at a superatmospheric pressure not above 200 p. s. i. g. and sufficient to maintain a substantial amount of water in the oxidate, cooling said oxidate and crystallizing toluic acid from said oxidate at a subatmospheric pressure, removing substantially all water from said oxidate during said cooling and crystallization, filtering the oxidate containing crystallized toluic acid to recover said toluic acid and recycling filtrate from said filtration step to the xylene oxidation step.

7. The method for producing p-toluic acid which comprises oxidizing a p-xylene with an oxygen-containing gas in the presence of a cobalt oxidation catalyst at a temperature within the range of 125° to 175° C. and at a superatmospheric pressure within the range of 125 to 175 p. s. i. g. and sufficient to maintain a substantial amount of water in the oxidate, cooling said oxidate and crystallizing p-toluic acid from said oxidate at a subatmospheric pressure, removing substantially all water from said oxidate during said cooling and crystallization, filtering the oxidate containing crystallized p-toluic acid to recover said p-toluic acid and recycling filtrate from said filtration step to the xylene oxidation step.

8. In a process for the oxidation of an alkylated benzene at a superatmospheric pressure sufficient to maintain a substantial amount of water in the oxidate and in the presence of a cobalt oxidation catalyst to form an organic acid corresponding to said alkylated benzene wherein said acid is crystallized and separated from the resulting oxidate, the improvement which comprises reducing the cobalt content of the separated acid by removing water from said oxidate at a temperature above the temperature at which said acid is crystallized in said oxidate prior to said crystallization.

9. In a process for the oxidation of a xylene at a superatmospheric pressure sufficient to maintain a substantial amount of water in the oxidate and in the presence of a cobalt oxidation catalyst to form the corresponding toluic acid wherein said acid is crystallized and separated from the resulting oxidate, the improvement which comprises reducing the cobalt content of the separated acid by removing water from said oxidate at a temperature above the temperature at which said toluic acid is crystallized in said oxidate prior to said crystallization.

10. In a process for the oxidation of p-xylene at a superatmospheric pressure sufficient to maintain a substantial amount of water in the oxidate and in the presence of a cobalt oxidation catalyst to form p-toluic acid wherein said acid is crystallized and separated from the resulting oxidate, the improvement which comprises reducing the cobalt content of the separated p-toluic acid by removing water from said oxidate at a temperature above the temperature at which said toluic acid is crystallized in said oxidate prior to said crystallization.

11. In a process for the oxidation of p-xylene at a superatmospheric pressure sufficient to maintain a substantial amount of water in the oxidate and in the presence of a cobalt oxidation catalyst to form p-toluic acid wherein said p-toluic acid is crystallized and separated from the resulting oxidate, the improvement which comprises reducing the cobalt content of the separated p-toluic acid by removing substantially all water from said oxidate at a temperature above 80° C. and above the temperature at which said p-toluic acid is crystallized in said oxidate prior to the crystallization of said p-toluic acid in said oxidate.

12. The method for producing a toluic acid which comprises oxidizing a xylene with an oxygen-containing gas in the presence of a cobalt oxidation catalyst at a temperature within the range of 80° to 250° C. and at a superatmospheric pressure not above 200 p. s. i. g. and sufficient to maintain a substantial amount of water in the oxidate, removing substantially all water from said oxidate, crystallizing toluic acid in the water-free oxidate, filtering the water-free oxidate containing crystallized toluic acid to recover said toluic acid and recycling filtrate from said filtration step to the xylene oxidation step.

13. The method for producing p-toluic acid which comprises oxidizing p-xylene with an oxygen-containing gas in the presence of a cobalt oxidation catalyst at a temperature within the range of 80° to 250° C. and at a superatmospheric pressure not above 200 p. s. i. g. and sufficient to maintain a substantial amount of water in the oxidate, contacting resulting oxidate with an oxygen-containing gas at atmospheric pressure at a temperature within the range of 120° C. and the reflux temperature of said oxidate for a period of time sufficient to remove substantially all water from said oxidate, cooling the water-free oxidate to crystallize p-toluic acid therein, filtering the water-free oxidate containing crystallized p-toluic acid to recover said p-toluic acid, washing recovered p-toluic acid with p-xylene and passing filtrate from said filtrate step and p-xylene from said washing step to the p-xylene oxidation step.

14. The method for producing p-toluic acid which comprises oxidizing p-xylene with air in the presence of a cobaltous toluate at a temperature within the range of 80° to 250° C. and at a superatmospheric pressure not above 200 p. s. i. g. and sufficient to maintain a substantial amount of water in the oxidate, contacting resulting oxidate with air at atmospheric pressure at a temperature within the range of 120° C. and the reflux temperature of said oxidate for a period of time sufficient to remove substantially all water from said oxidate, cooling the water-free oxidate to crystallize p-toluic acid therein, filtering the water-free oxidate containing crystallized p-toluic acid to recover said p-toluic acid, washing recovered p-toluic acid with p-xylene and passing filtrate from said filtrate step and p-xylene from said washing step to the p-xylene oxidation step.

15. The method for producing p-toluic acid which comprises oxidizing p-xylene with an oxygen-containing gas in the presence of a cobalt oxidation catalyst at a temperature within the range of 80° to 250° C. and at a superatmospheric pressure not above 200 p. s. i. g. and sufficient to maintain a substantial amount of water in the oxidate, contacting resulting oxidate with an inert gas at atmospheric pressure at a temperature within the range of 120° C. and the reflux temperature of said oxidate for a period of time sufficient to remove substantially all water from said oxidate, cooling the water-free oxidate to crystallize p-toluic acid therein, filtering the water-free oxidate containing crystallized p-toluic acid to recover said p-toluic acid, washing recovered p-toluic acid with p-xylene and passing filtrate from said filtrate step and p-xylene from said washing step to the p-xylene oxidation step.

16. The method according to claim 15 wherein the inert gas is nitrogen.

17. The method for producing p-toluic acid which comprises oxidizing p-xylene with an oxygen-containing gas in the presence of a cobalt oxidation catalyst at a temperature within the range of 80° to 250° C. and at a superatmospheric pressure not above 200 p. s. i. g. and sufficient to maintain a substantial amount of water in the oxidate, refluxing resulting oxidate for a period of time sufficient to remove substantially all water therefrom, cooling the water-free oxidate to crystallize p-toluic acid therein, filtering the water-free oxidate containing crystallized p-toluic acid to recover said p-toluic acid, washing recovered p-toluic acid with p-xylene and passing filtrate from said filtrate step and p-xylene from said washing step to the p-xylene oxidation step.

References Cited in the file of this patent

UNITED STATES PATENTS 2,696,499  Himel _____ Dec. 7, 1954

FOREIGN PATENTS 510,412  Belgium _____ Oct. 4, 1952